Jan. 7, 1930.  C. C. BLAKE  1,742,632
HEEL LASTING MACHINE
Filed March 7, 1923   7 Sheets-Sheet 1

INVENTOR
Charles C. Blake
by Charles W. McDermott
his attorney

Jan. 7, 1930. C. C. BLAKE 1,742,632
HEEL LASTING MACHINE
Filed March 7, 1923 7 Sheets-Sheet 7

INVENTOR
Charles C. Blake
by Charles W. McDermott
his attorney

Patented Jan. 7, 1930

1,742,632

UNITED STATES PATENT OFFICE

CHARLES C. BLAKE, OF BROOKLINE, MASSACHUSETTS, ASSIGNOR, BY MESNE ASSIGN-
MENTS, TO ISABEL F. HYAMS, SARAH A. HYAMS, BOSTON SAFE DEPOSIT AND TRUST
COMPANY, BERTRAM N. CARVALHO AND HARRY LE BARON SAMPSON, TRUSTEES

HEEL-LASTING MACHINE

Application filed March 7, 1923. Serial No. 623,403.

The present invention relates to lasting machines and more particularly to an end lasting machine for lasting the heel seat of a Blake welt shoe.

To the accomplishment of this object and such others as may hereinafter appear, the features of the invention relate to certain devices, combinations and arrangements of parts hereinafter described and then set forth broadly and in detail in the appended claims which possess advantages readily apparent to those skilled in the art.

The various features of the present invention will be readily understood from an inspection of the accompanying drawings, illustrating the best form of the invention at present known to the inventor, in which.

Figure 1:
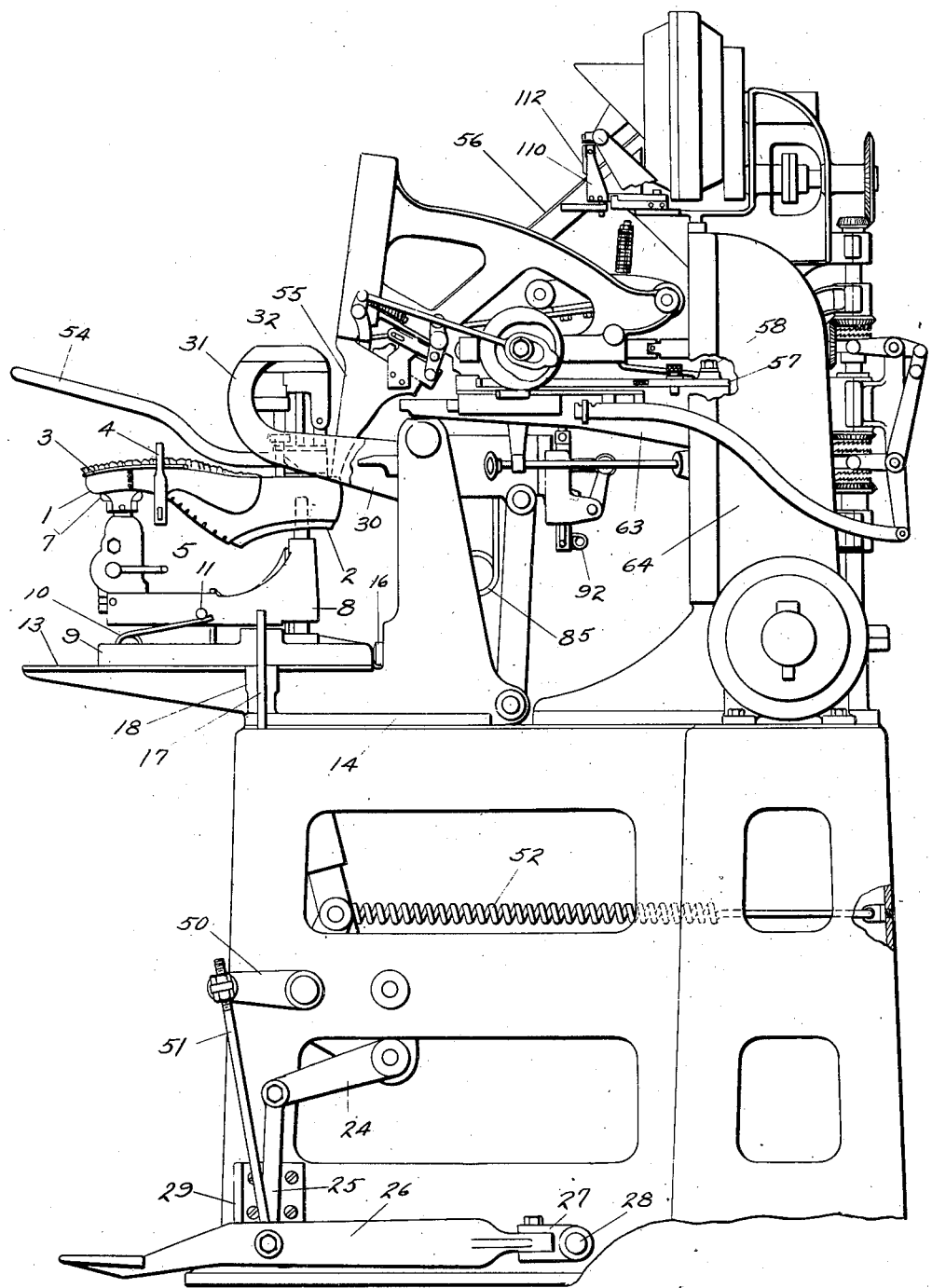
Figure 1 is a right side elevation of the heel lasting machine with the wipers at the completion of the wiping stroke.
Figure 2:
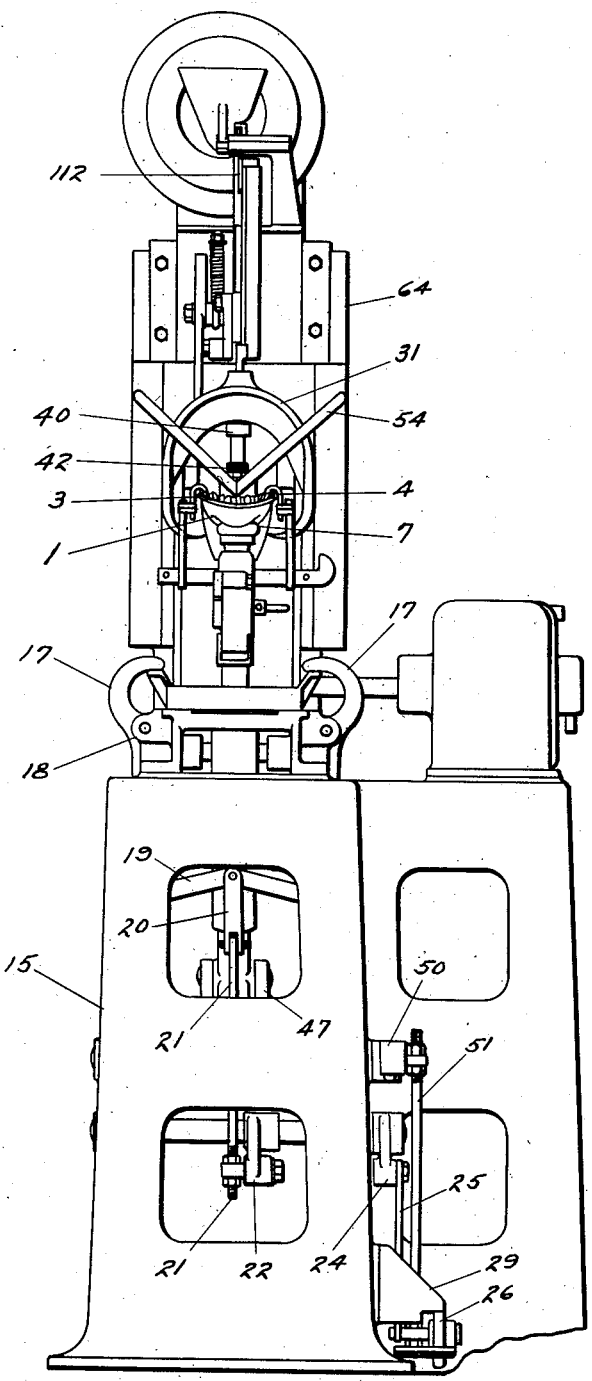
Fig. 2 is a front elevation.

The machine illustrated in the drawings performs the heel lasting operation on a partially lasted shoe, comprising an upper 1, (Figs. 1, 2 and 3) the fore part of which is held in lasted position against the edge face of an insole on the bottom of a last 2, by a formed binder 3 which is secured in its binding position by a clamp 4, the jaws of which are arranged to embrace the opposite sides of the shoe. The upper at the shank and around the heel seat projects loosely about the shoe except that a tack is driven on each side of the shoe to hold the upper overlaid upon the insole at the breast line.

Figure 4:
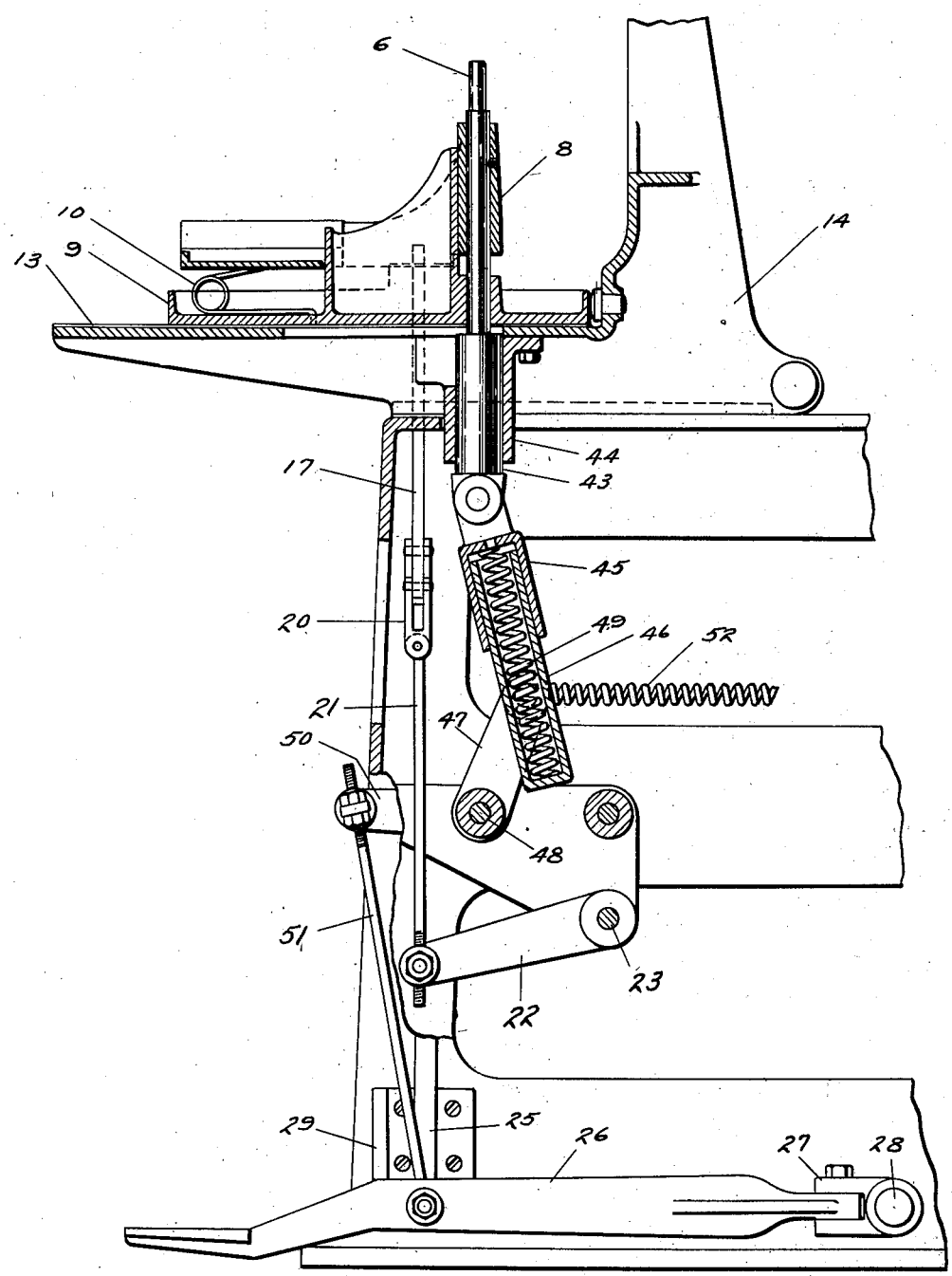
Fig. 4 is a detail in right side elevation, partly in section, of the work support and the operating mechanism therefor, the toe supporting saddle being removed.
Figure 5:
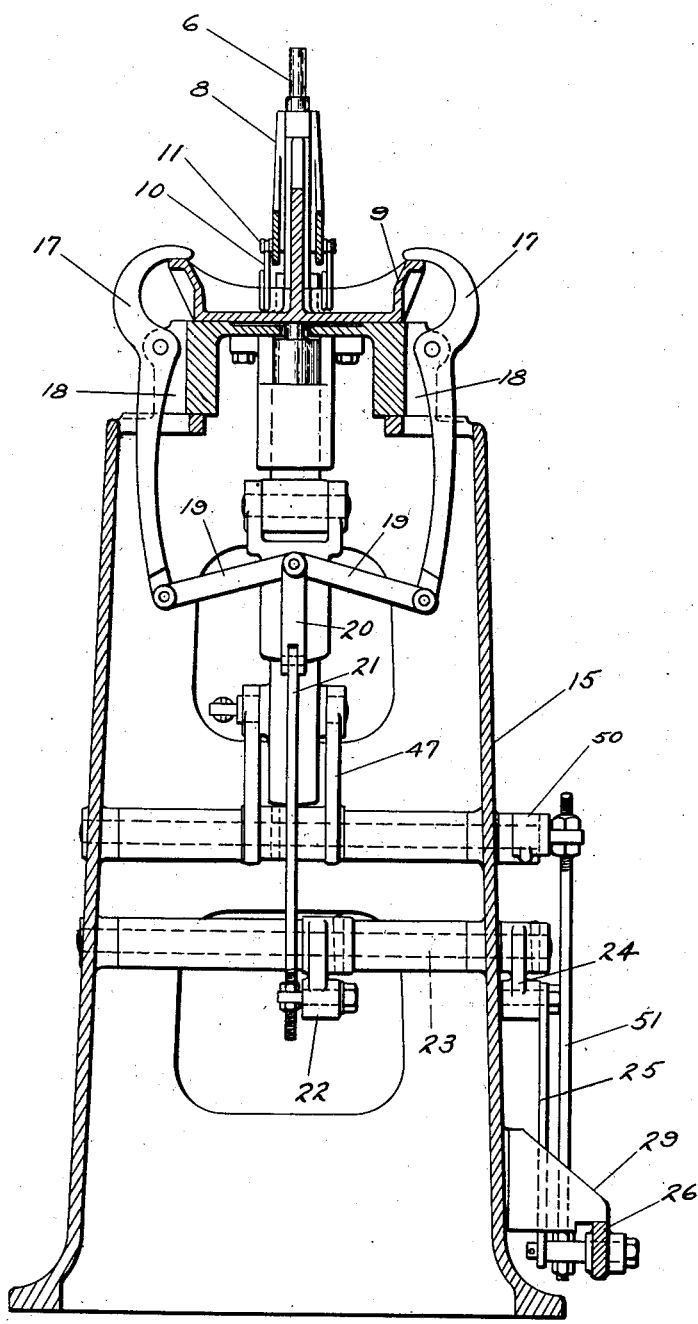
Fig. 5 is a detail in front sectional elevation.

The partially lasted shoe is mounted upon a work support 5 having a heel spindle 6 and a toe saddle 7. The heel spindle 6 and toe saddle 7 are carried by a frame 8 which is mounted to slide vertically upon the base 9 of the work support 5. The frame 8 and base 9 are normally held separated with the heel pin and toe saddle elevated by a pair of grasshopper springs 10 (Figs. 3, 4 and 5) secured to the base 9 and arranged on opposite sides of the frame 8 to engage pins 11 carried thereby. The heel pin 6 is extended to pass freely through the base 9 and loosely ride in a central slot 12 formed in a table 13. The table 13 is formed on a bracket 14 which is secured to the machine base 15.

In order to position the work support 5 in proper position for the operation of the heel lasting mechanism the bracket 14 carries a fixed stop 16 (Fig. 3) which is arranged to engage the rear of the base 9 and determine the operative position of the work with relation to the heel lasting tools. After the engagement of the work support 5 with the stop 16 the front end of the work support may be shifted laterally on the table 13 to compensate for the swing of the heel seat. After being positioned upon the table 13 the work support is clamped by a pair of arms 17 (Fig. 5) which are pivoted on ears 18, carried by the bracket 14, and arranged to engage the opposite sides of the base 9.

The lower ends of the arms 17 are connected by links 19 to a yoked strap 20 (Figs. 4 and 5) which in turn is pivoted to a rod 21 adjustably connected at its lower end to an arm 22. The arm 22 is secured to a rock shaft 23 which is journaled in the base 15. One end of the rock shaft 23 carries a second arm 24 (Figs. 1 and 5) which is connected by a link 25 to a foot treadle 26. The foot treadle 26 is pivoted to swing laterally on an arm 27 which is secured to a short rock shaft 28 journaled in the frame 15. With this construction, depression of the treadle vertically closes the arms 17 upon the base 9. To lock the arms 17 in clamping position the treadle 26 is moved laterally to position the treadle beneath a locking lug 29 (Figs. 1, 4 and 5), carried by the frame 15.

In order to support the heel lasting instrumentalities, the bracket 14 rigidly supports a frame 30 which extends in a direction substantially longitudinally of the shoe and terminates in a bridge 31 which forms a transverse arch over the shoe bottom. The bridge 31 supports a wiper carrier 32 having wipers 33 suspended therefrom. To this end, the wiper carrier 32 carries a pair of struts 34 which are universally connected at their upper ends to the wiper carrier and at their lower ends to the wipers 33. The wipers 33 comprise a pair of sections jointed at 35 and each section carries a narrow spring metal finger which constitutes the active face of the wipers. In the axis of the pivot 35 the wipers are universally connected to a third strut 37 which is loosely pivoted on a stud 38 carried by the wiper carrier 32.

In order to gage the initial operative position of the wipers with relation to the shoe bottom the bridge 31 carries a gage or holddown 39. The holddown 39 is loosely carried by a bracket 40 secured to the bridge 31, but is held from dropping out by a pin 41 on the holddown which works in a slot formed in the bracket 40. The holddown is threaded for a portion of its length and this threaded portion is engaged by a thumb nut 42. Manipulation of the nut 42 adjusts the distance the holddown is elevated under pressure of the work. This distance should approximate the thickness of the overlaid upper and to aid the operative in determining the proper adjustment for the holddown it is extended above the bridge 31. The distance the holddown pops up above the bridge 31 corresponds to the thickness of the upper operated upon.

In order to press the insole of the shoe against the gage or holddown 39 with a heavy pressure the bottom of the heel pin 6 is engaged by a cylindrical block 43 (Fig. 3) mounted to slide in a bearing 44 secured to the bracket 14. The block 43 is pivoted to an arm 45 which is chambered to receive a cylinder 46 which is pivoted on a yoke 47 secured to a rock shaft 48 journaled in the base 15. Interposed between the arm 45 and cylinder 46 is a coiled spring 49, one end of which engages the arm 45 and the other end of which engages the bottom of the cylinder 46. With this construction, the yoke 47, arm 45 and cylinder 46 form a toggle, one of the arms of which is constructed to yield longitudinally.

In order to position the insole against the gage 39 and apply the pressure mechanism thereto simultaneously with the clamping of the arms on to the base 9, the rock shaft 48 is provided with an arm 50 (Fig. 1) to the free end of which a rod 51 is adjustably connected. The lower end of the rod 51 is pivoted to the treadle 26. With this construction, actuation of the treadle 26 tends to straighten the arms of the pressure toggle, thus elevating the work, and thereby placing the insole against the gage 39 and clamping the work support on the table 13. Continued pressure of the treadle 26 causes the spring 49 to be compressed, thus applying pressure to the shoe. As it is desirable that the work shall immediately drop away from the gage 39 when the treadle 26 is released, the top of the arm 45 is arranged to engage the bottom of the bearing 44 (Fig. 3) in order to prevent the complete making of the pressure toggle. When the treadle 26 is released a spring 52 connected at one end to the base 15 and at its other end to the yoke 47, restores the work support to its original inoperative position. The downward movement of the work support is limited by a post 53 secured to the base 15 and arranged to engage the bottom of the cylinder 46.

Figure 3:
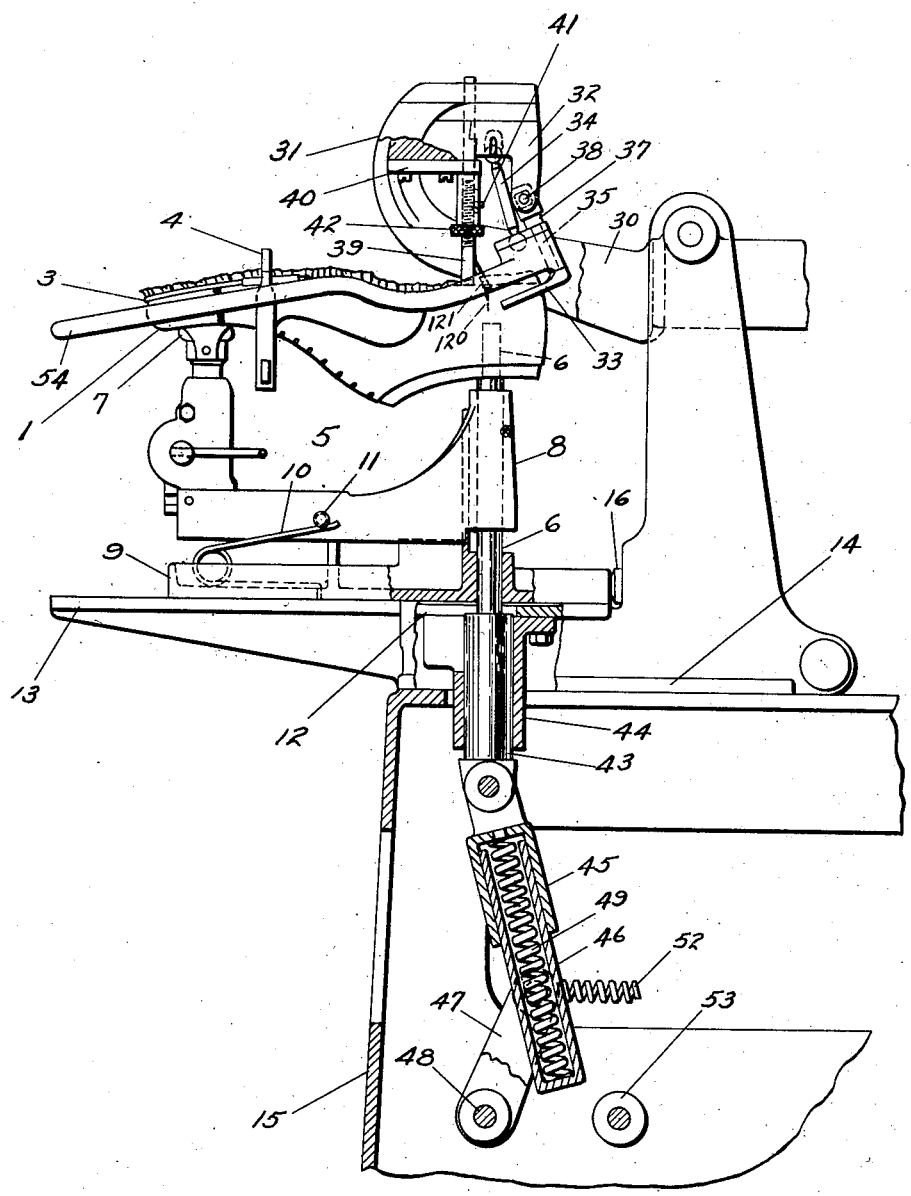
Fig. 3 is a detail in right side elevation, partly in section, showing the relative position of the work and the wipers at the beginning of the wiping stroke.

The gage 39 determines the operative position of the wipers with relation to the shoe bottom. The initial operative position of the wipers as determined by the gage 39 is such that the wipers engage the upstanding upper below the exposed face of the shoe bottom when the wipers are closed upon the shoe by manipulation of the handles 54 connected to the wipers. This position is illustrated in Fig. 3. After the wipers are initially engaged with the upper in the manner described further actuation of the handles causes the wipers to slide up the back of the shoe thus imparting an updraw movement to the upper and stretching it around the face of the heel. Continued closing movement of the handles 54 causes the wipers to wipe the updrawn upper over the shoe bottom. The work support is depressed during the initial overdraw movement of the wipers, thus withdrawing the holddown from the work and causing the heavy pressure of the compressed spring 49 to be transmitted through the upper to the wipers throughout the overdraw movement thereof.

From an inspection of Figure 3, it will be noticed that the pivots of the struts 34 and 37 are mounted so that their projections upon the plane of the shoe bottom coincide with the shoe bottom between the ends thereof. Consequently at the completion of the wiping stroke of the wipers, the back or inactive edges of the wipers are separated from the edge of the shoe bottom by a strip of overdrawn upper. This construction permits the fastening of the overdrawn upper to the heel seat without the necessity of any retractive movement of the wipers.

In order to secure the upper to the heel seat the machine is provided with a traveling tacker which automatically inserts tacks in the strip of overdrawn upper separating the back edges of the wipers from the edge of the shoe bottom around the heel seat from one breast corner to the other. To this end the machine is provided with the traveling tacker disclosed in my Patent No. 1,394,806, Oct. 25, 1921. Briefly described this traveling tacker is provided with a nozzle 55 and a raceway 56. The tacks are withdrawn from the raceway 56 and delivered to the nozzle 55 for operation by the driver therein in exactly the same manner as described in the patent referred to. The nozzle 55 and raceway 56 are carried by a flat plate 57 which is pivoted at its rear end upon a pin 58 carried by a second flat plate 59. The plate 59 is pivoted near its front end upon a pin 60 carried by a slide 61 mounted to embrace and slide upon ways 62 formed in a horizontal extension 63 of a bracket 64 secured to the base 15. Interposed between the plates 57 and 59 is a slide 65 which carries a roll 66 arranged to engage a V shaped notch 67 formed in the front end of the slide 57. The roll 66 is held yieldingly in the notch 67 by a coiled spring 68 one end of which is secured to a pin 69 depending from the slide 65 and the other end of which is secured to a pin 70 depending from the slide 59. With this construction the nozzle 55 is pressed laterally against the back edges of the wipers so that during the traveling movement of the tacker the wipers act as a guide and the nozzle 55 as a gage co-operating with the guide to direct the traveling movement of the tacker.

Figure 8:
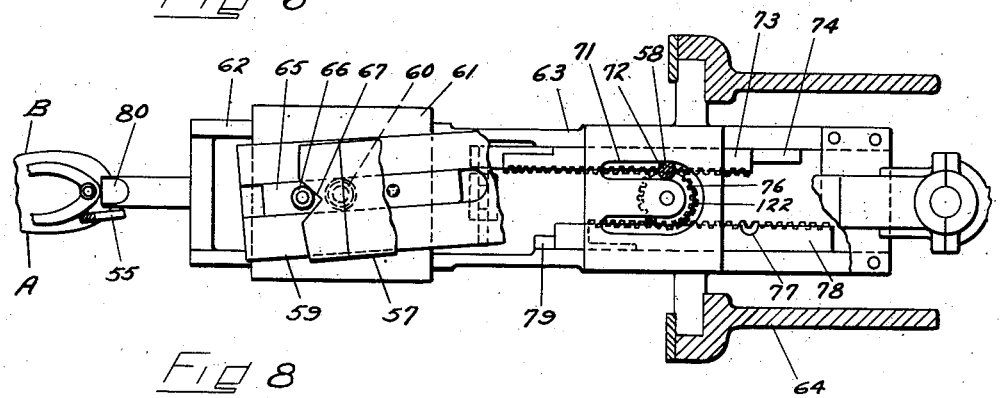
Fig. 8 is a detail in plan, partly in section, showing the relative position of the wipers, the tacker, and the clearer.

In order to move the nozzle 55 through a predetermined path which is the same for all sizes and styles of shoes operated upon the lower end of the pin 58 passes loosely into a guideway 71 (Fig. 8) having substantially a horse-shoe formation. The guideway 71 is formed in the plate 63. The pin 58 when positioned in one end of the guideway 71 fits into a semi-cylindrical notch 72 formed in a rack 73 mounted to slide in a way 74 formed in the plate 63. The rack 73 carries the pin 58 along the guideway to the juncture of the straight and curved portions thereof at which time a semi-cylindrical notch 75 formed in the peripheral edge of a rotary disk 76 engages the pin 58 and removes it from the rack 73 and transfers the pin along the curved portion of the guideway 71. At the other juncture of the curved and straight portions of the guideway 71 the pin 58 leaves the notch 75 and enters a semi-cylindrical notch 77 formed in a rack 78 mounted to slide in a way 79 formed in the plate 63.

The nozzle 55 is thus transferred around the heel seat from one breast corner to the other breast corner. The spring 68 by pressing the nozzle 55 laterally against the forward portions of the wipers permits the nozzle to traverse a path determined by the forward portion of the wipers for each shoe operated upon which may be different from the path determined by the guideway 71.

Figure 9:
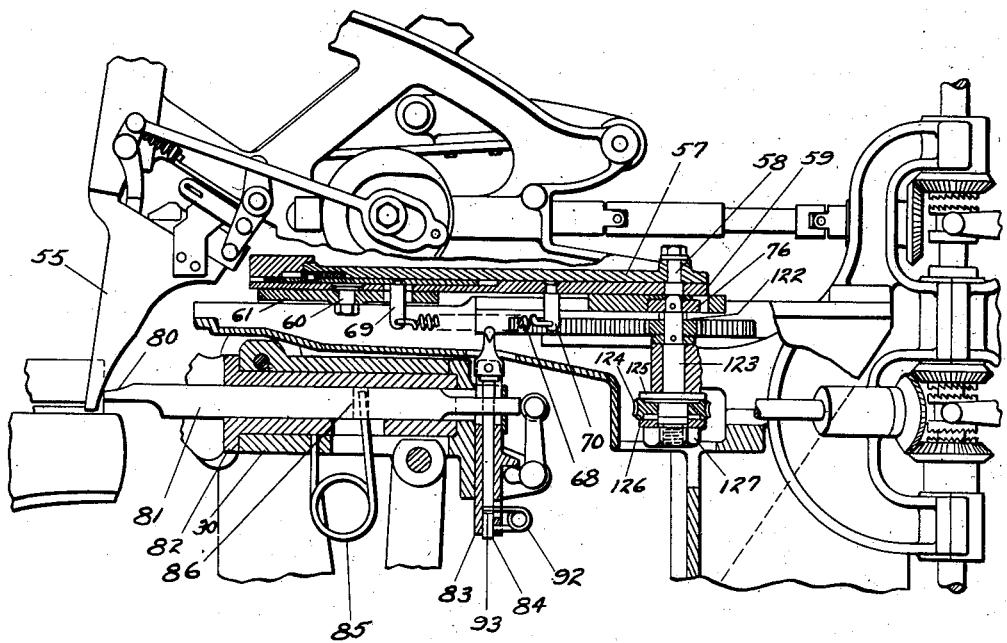
Fig. 9 is a detail in right side elevation, partly in section, showing the relative position of the wipers, tack driver and the clearer, together with some of the operating mechanism therefor.

In order to ensure the free travel of the nozzle 55 about the back end of the wipers the machine is provided with a clearer or pusher 80 (Figs. 8 and 9) which operates to push the wipers bodily forward out of the path determined by the curved portion of the guideway 71. With this clearer all danger of the nozzle sticking on the back of the wipers at the time its direction of movement is reversed is obviated. The clearer 80 is formed on the end of a slide 81 mounted to slide in a bearing 82 formed in the frame 30. The rear end of the slide 81 is mounted to slide within a post 83 which is supported to slide vertically on the frame 30. The rear end of the slide 81 is also forked to loosely embrace a rod 84 mounted to slide vertically within the post 83.

The clearer 80 is normally forced rearwardly by a looped spring 85 one end of which is secured to the frame 30 and the other end of which is engaged in a slot 86 formed in the slide 81. The spring 85 holds the rear end of the slide 81 against a cylindrical block 87 carried by the vertical arm of a bell crank lever 88 pivoted on the frame 30. The horizontal arm of the bell crank lever engages a lug 89 formed on the post 83.

In order to operate the clearer 80 to push the wipers forwardly and then return to its inoperative position just before the nozzle 55 reaches the back end of the wipers the post 83 carries a pin 90 pivoted at 91 to the post. The pin 90 is elongated so that it bridges the distance between the racks 73 and 78. The pin 90 is normally held in an upright position by a looped spring 92 one end of which is secured to the post 83 and the other end of which engages a slot 93 formed in the rod 84. The spring 92 presses the top of the rod 84 against a flat surface 94 on the base of the pin 90 and normally holds the pin upright (Fig. 16).

Figure 10:
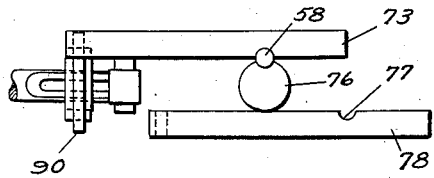
Figs. 10 and 11 are diagrammatic plans showing two different positions of the mechanism for operating the clearer.
Figure 11:
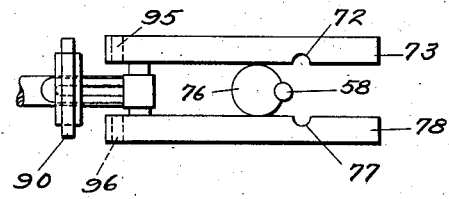
Figure 12:
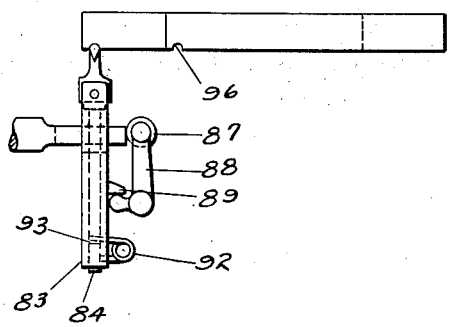
Figs. 12 and 13 are diagrammatic right side elevations showing the same positions of the mechanism for operating the clearer as shown in Figs. 10 and 11, respectively.
Figure 13:
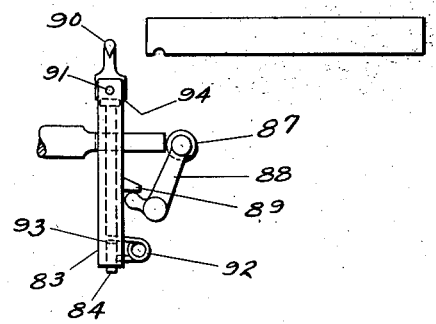
Figure 14:
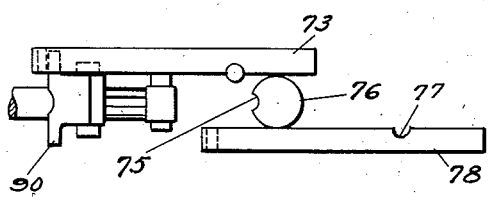
Figs. 14 and 15 are diagrammatic plans showing two other different positions of the mechanism for operating the clearer.
Figure 16:
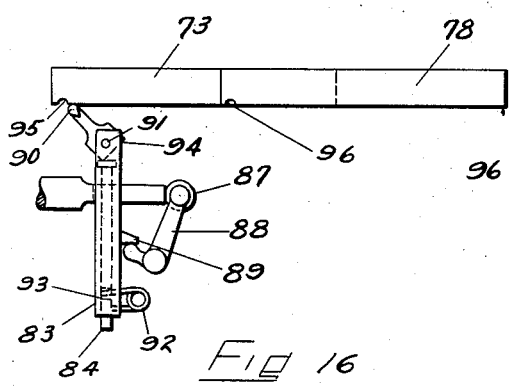
Figs. 16 and 17 are diagrammatic right side elevations showing the same positions of the mechanism for operating the clearer as shown in Figs. 14 and 15, respectively.

When the nozzle 55 is at the breast corner A (Fig. 8) ready to start on its travel to the breast corner B one end of the finger engages the bottom of the rack 73 (Fig. 16). At this time the finger is tipped to the left, but the only result of this movement is to tension the spring 92. As the rack 73 continues to move to the right (Fig. 10) the finger 90 snaps into a groove 95 formed in the rack 73 and then continued movement of the rack 73 to the right (Fig. 10) pushes the finger 90 down thus lowering the lug 89 and operating the bell crank lever 88 in a direction to move the clearer 80 against the tension of the spring 85 and push the wipers forwardly. This movement continues until the finger 90 snaps out of the groove 95 (Figs. 11 and 13) whereupon the spring 85 immediately returns the clearer to its normal inoperative position.

Figure 15:
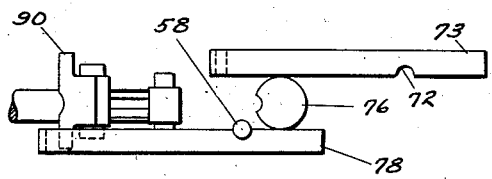
Figure 17:
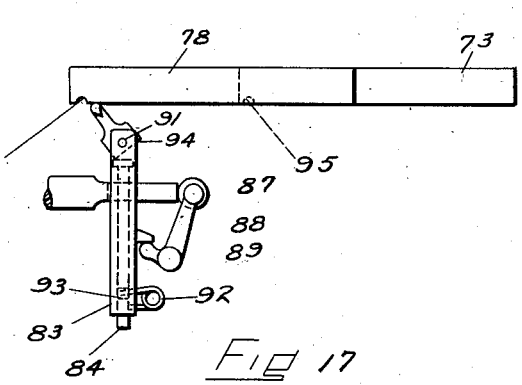

As the nozzle 55 approaches the breast corner B the end of the rack 78 during its move to the left (Figs. 15 and 17) strikes the other end of the finger 90 and tips it down to permit a groove 96 formed in the rack 78 to snap across the finger 90 without operating the clearer 80. The machine then stops with the rack 78 and finger 90 at rest in the position of Fig. 17. When the machine is restarted to cause the nozzle to travel from the breast corner B to the breast corner A on a new shoe the finger 90 snaps into the groove 96 to operate the clearer 80 to again push the wipers forwardly.

As the nozzle 55 travels back and forth on successive shoes from one breast corner to the other the tacks used in securing the overdrawn upper are rapidly withdrawn from the raceway 56. In order to replenish the raceway 56 with tacks the machine is provided with a loading raceway 97 which is loaded with tacks by the same mechanism described in Patent No. 1,386,681 for loading the raceway 209 thereof. The raceway 56 is replenished with tacks from the raceway 97 when the nozzle 55 is located at the back of the wipers. To this end the raceway is provided with a V shaped plate 98 (Figs. 6 and 7) which embraces a cylindrical block 99 carried by a plate 100 which is mounted to slide on a plate 101 pivoted at 102 on the bracket 64. The plate 101 is normally held in a central position by a pair of leaf springs 103 secured to the bracket 64 and arranged to embrace the plate 101. The plate 100 is normally held forward by a coiled spring 104 arranged in a chamber 105 formed in the plate 100. One end of the spring 104 engages the bottom of the chamber 105 and the other end of the spring 104 is coiled around a stud 106 the head of which engages a pin 107 secured to the plate 101.

Figure 6:
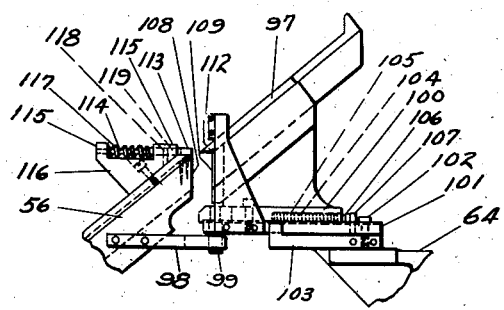
Fig. 6 is a detail in right side elevation of the traveling and the loading raceways.
Figure 7:
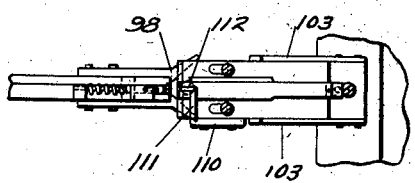
Fig. 7 is a detail in plan of the parts shown in Fig. 6.

When the nozzle 55 is at one of the breast corners the raceways 56 and 97 are separated (Fig. 6). As the nozzle 55 approaches the back of the wipers the sides of the plate 98 engage the roll 99 and turn the plate 101 to enable the roll 99 to travel down into the crotch of the plate. At this time a surface 108 on the raceway 56 engages a surface 109 on the raceway 97 and moves the raceway 97 backward against the tension of the spring 104. The tacks on the loading raceway 97 are now free to pass into the raceway 56.

To hold the tacks from flowing out of the raceway 97 when the raceways 56 and 97 are again separated the plate 101 carries a bracket 110 which is provided with an overhanging finger 111 having a depending portion 112 arranged when the raceway 97 is in its forward position to engage the head of the first tack in the raceway 97.

In order to prevent tacks in the raceway 56 from jumping out from the end thereof during the tack driving operation the raceway 56 carries a finger 113 mounted to close the end of the raceway 56. To this end the finger 113 is formed on a rod 114 mounted to slide in a pair of lugs 115 formed on a plate 116 carried by the raceway 56. The finger is normally pressed forwardly in position to close the end of the raceway by a spring 117 coiled around the rod 114 and interposed between the lugs. The forward movement of the finger 113 under the influence of the spring is limited by a pin 118 on the plate 116 which works in a slot 119 formed in the finger 113. With this construction, when the raceways 56 and 97 come in contact the finger 113 is pushed backwardly against the tension of the spring 117 to open the roadway in the raceway 56 to permit tacks to pass freely from the raceway 97 to the raceway 56. When the raceways 56 and 97 separate the spring 117 returns the finger 113 to a position where it closes the raceway 56.

Sometimes the heel pin sockets in the lasts vary to such an extent as to make the use of the stop 16 (Fig. 3) impracticable. In this event, it is desirable to gage the lengthwise position of the shoe relatively to the wipers from a tack 120 (Fig. 3) which secures the heel seat of the insole to the last. To this end the holddown 39 carries a tack indicator 121 arranged to rest on the head of the tack 120. The tack 120 inserted into the insole bears a definite relation to the periphery thereof in accordance with the method of assembling disclosed in the patent to Fernald, 1,517,973, December 2, 1924.

In order to drive the racks 73 and 78 through a yielding connection to prevent breakage in case of a jam the racks are driven by a pinion 122 (Fig. 9) mounted on a vertical shaft 123 which is driven from some suitable source of power through a worm wheel 124. The worm wheel 124 is pressed against a flange 125 on the shaft 123 by a second flange 126 loosely mounted on the shaft 123 and backed by a nut 127 threaded on the end of the shaft 123. If the movement of the racks is resisted by a pressure exceeding the tension of the nut 127 on the flange 126 the worm wheel 124 will slip while the shaft 123 remains stationary.

What is claimed as new is:

1. A lasting machine, having, in combination, a holddown, a shoe support, a pressure mechanism for pressing the holddown and the shoe, mounted on the support, together, and wipers arranged to be initially engaged with the shoe substantially below the plane of the shoe bottom and then closed on the shoe, the wipers during their closing movement updrawing and overdrawing the upper and by the overdrawing movement removing the holddown from the work by depressing the support against the pressure of the pressure mechanism.

2. A lasting machine, having, in combination, a holddown arranged to engage the shoe bottom at a point spaced from the heel seat tack and an indicator on the holddown thereon mounted to engage the heel seat tack.

3. A lasting machine, having, in combination, a carrier, a holddown carried thereby and movable vertically under the pressure of the work, means for adjusting the holddown to limit its vertical movement in accordance with the thickness of the upper operated upon, and means located above the carrier to indicate the amount of holddown adjustment.

4. A lasting machine, having, in combination, an end lasting mechanism, a holddown independent of the lasting mechanism, a work support including a heel pin, and means including a treadle and a toggle for elevating the heel pin by a movement normal to the last bottom to clamp the work against the holddown.

5. A lasting machine, having, in combination, a holddown, a vertically movable work support, pressure mechanism for forcibly pressing the holddown and the work, mounted on the support, together, and wipers constructed and arranged to depress the work support during the overdraw wiping operation.

6. A lasting machine, having, in combination, wipers for wiping the upper over the shoe bottom, the back or inactive edges of said wipers being separated from the edge of the shoe bottom by a strip of overdrawn upper at the completion of the wiping stroke, means for inserting fastenings through the strip of overdrawn upper, and means for pushing the wipers forwardly during the fastening inserting operation.

7. A lasting machine, having, in combination, wipers for wiping the upper over the shoe bottom, the back or inactive edges of the wipers being separated from the edge of the shoe bottom by a strip of overdrawn upper at the completion of the wiping stroke, means for inserting fastenings through the strip of overdrawn upper, means for causing the inserting means to travel from one breast corner to the other, and means for pushing the wipers forwardly to insure a free travel of the inserting means around the tip end of the wipers.

8. A lasting machine, having, in combination, wipers for wiping the upper over the shoe bottom, the back or inactive edges of the wipers being separated from the edge of the shoe bottom by a strip of overdrawn upper at the completion of the wiping stroke, means for inserting fastenings through the strip of overdrawn upper, means including devices moving in opposite directions for causing the inserting means to travel from one breast corner to the other, a pusher for pushing the wipers forwardly to insure a free travel of the inserting means around the tip end of the wipers, and connections for operating the pusher by said devices.

9. A lasting machine, having, in combination, wipers for wiping the upper, a pusher for moving the wipers forwardly after the completion of the wiping stroke, a spring for holding the pusher normally in an inoperative position, and means for operating the pusher against the tension of the spring comprising a pair of racks movable in opposite directions.

10. A lasting machine, having, in combination, wipers for wiping the upper, a pusher for moving the wipers forwardly after the completion of the wiping stroke, a spring for holding the pusher normally in an inoperative position, and means for operating the pusher against the tension of the spring comprising a pair of racks movable in opposite directions, and a finger operatively connected to the pusher arranged to engage alternately the racks.

In testimony whereof I have signed my name to this specification.

CHARLES C. BLAKE.